United States Patent
Kondo (10) Patent No.: US 12,487,288 B2
(45) Date of Patent: Dec. 2, 2025

(54) LOAD TESTING DEVICE

(71) Applicant: TATSUMI RYOKI CO., LTD, Tokyo (JP)

(72) Inventor: Toyoshi Kondo, Tokyo (JP)

(73) Assignee: TATSUMI RYOKI CO., LTD, Tokyo (JP)

(*) Notice: Subject to any disclaimer, the term of this patent is extended or adjusted under 35 U.S.C. 154(b) by 180 days.

(21) Appl. No.: 18/684,471

(22) PCT Filed: Aug. 26, 2021

(86) PCT No.: PCT/JP2021/031315
§ 371 (c)(1),
(2) Date: Feb. 16, 2024

(87) PCT Pub. No.: WO2023/026427
PCT Pub. Date: Mar. 2, 2023

(65) Prior Publication Data
US 2024/0353492 A1    Oct. 24, 2024

(51) Int. Cl.
*G01R 31/34*    (2020.01)
(52) U.S. Cl.
CPC ................. *G01R 31/34* (2013.01)
(58) Field of Classification Search
CPC ........ G01R 31/34; G01R 31/40; G01R 31/42; G01R 31/343
See application file for complete search history.

(56) References Cited

U.S. PATENT DOCUMENTS

2014/0210495 A1* 7/2014 Kondo ............... G01R 31/34
                                                  324/750.01
2022/0146578 A1* 5/2022 Kondo ............... G01R 31/34

FOREIGN PATENT DOCUMENTS

| JP | H9-15307 A | 1/1997 |
| JP | 2011-169702 A | 9/2011 |
| JP | 2020-112492 A | 7/2020 |
| JP | 6906269 B1 | 7/2021 |

(Continued)

OTHER PUBLICATIONS

International Search Report issued in PCT/JP2021/031315 mailed on Nov. 16, 2021 with English Translation (5 pages).

(Continued)

*Primary Examiner* — Son T Le
(74) *Attorney, Agent, or Firm* — Nakanishi IP Associates, LLC (57) ABSTRACT

In a load testing device, each of a first coil group and a fine adjustment coil group includes one or more coil sets including a U-phase coil, a V-phase coil, and a W-phase coil. When receiving power supply from a first test target power source, power from the first test target power source is supplied to the first coil group without passing through a bidirectional transformer, and is supplied to the fine adjustment coil group in a stepped-down state through the bidirectional transformer. When receiving power supply from a second test target power source having a lower voltage than the first test target power source, power from the second test target power source is supplied to the first coil group in a boosted state through the bidirectional transformer, and is supplied to the fine adjustment coil group without passing through the bidirectional transformer.

7 Claims, 6 Drawing Sheets

(56) References Cited

FOREIGN PATENT DOCUMENTS

| KR | 10-1371099 B1 | 3/2014 | | |
|----|---------------|--------|----|----------|
| WO | WO-2017134768 A1 | * | 8/2017 | ............. G01R 31/34 |

OTHER PUBLICATIONS

Written Opinion of International Searching Authority issued in PCT/JP2021/031315 mailed on Nov. 16, 2021 with English Translation (5 pages).

* cited by examiner

LOAD TESTING DEVICE

TECHNICAL FIELD

The present invention relates to a load testing device.

BACKGROUND ART

Conventionally, as in Patent Literature 1, a load testing device that performs a load test of a generator has been proposed.

CITATION LIST

Patent Literature

Patent Literature 1: JP 09-15307 A

SUMMARY OF INVENTION

Technical Problem

However, adjustment of a power factor is not considered.

Therefore, an object of the present invention is to provide a load testing device capable of easily adjusting the power factor corresponding to a plurality of types of test target power sources.

Solution to Problem

A load testing device according to the present invention includes a resistance unit provided with a plurality of resistor groups and receiving power supply from a test target power source. The load testing device includes a reactor unit having a bidirectional transformer and at least a first coil group and a fine adjustment coil group, and receiving power supply from the test target power source.

Each of the first coil group and the fine adjustment coil group includes one or more coil sets including a U-phase coil, a V-phase coil, and a W-phase coil.

When receiving power supply from a first test target power source as the test target power source, power from the first test target power source is supplied to the first coil group without passing through the bidirectional transformer, and is supplied to the fine adjustment coil group in a stepped-down state through the bidirectional transformer.

When receiving power supply from a second test target power source having a lower voltage than the first test target power source as the test target power source, power from the second test target power source is supplied to the first coil group in a boosted state through the bidirectional transformer, and is supplied to the fine adjustment coil group without passing through the bidirectional transformer.

A main adjustment coil group, the fine adjustment coil group, and the bidirectional transformer are provided, and power is supplied to said coil group in a state where a part of the power from the test target power source is boosted or stepped down.

Thus, it is possible to realize a load testing device capable of easily adjusting the power factor corresponding to both a high-voltage test target power source (first test target power source) and a low-voltage test target power source (second test target power source).

Preferably, the first coil group includes a plurality of the coil sets.

The fine adjustment coil group includes a plurality of coil groups.

Each of the plurality of coil groups of the fine adjustment coil group includes one or more coil sets.

Each of the coil sets of the first coil group and the coil sets of the plurality of coil groups of the fine adjustment coil group is held by a coil holding member.

The coil holding member includes: an iron core passing inside the U-phase coil; an iron core passing inside the V-phase coil; an iron core passing inside the W-phase coil; and a coupling portion for coupling the three iron cores.

Each of the plurality of coil holding members holds the coil set.

This makes it possible to stably hold the coil while maintaining electrical insulation.

In addition, as compared with a form in which one coil holding member holds the plurality of coil sets, it is less susceptible to electromagnetic influence from other coils.

More preferably, the three iron cores extend in an up-down direction.

The coupling portion includes a lower coupling portion for coupling lower portions of the three iron cores and an upper coupling portion for coupling upper portions of the three iron cores.

The three iron cores and one of the lower coupling portion and the upper coupling portion are integrally configured.

The other of the lower coupling portion and the upper coupling portion is configured separately from the three iron cores.

After the iron core is passed inside the coil, a part of the coupling portion (for example, the upper coupling portion) can be attached to the iron core to form the coil holding member.

More preferably, some of the plurality of coil groups of the fine adjustment coil group are attached to a first holding surface, and the others are attached to a second holding surface provided above the first holding surface.

By providing a plurality of surfaces (holding surfaces) for holding the coil groups on the upper and lower sides, it is possible to accommodate a large number of coil groups by effectively utilizing a region above a region where small coil groups are provided.

More preferably, the coil holding member includes an insulating cover that covers the U-phase coil, the V-phase coil, and the W-phase coil.

As compared with a form in which the insulating cover is not provided, it is possible to prevent adhesion of dust or the like to the coil and to be less susceptible to the electromagnetic influence from other coils.

Further, preferably, the first coil group includes a plurality of the coil sets.

The plurality of coil sets in the first coil group are connected in a switchable state between a state where the plurality of coil sets are connected in series and a state where one of the plurality of coil sets is used alone.

By switching a connection mode between series and parallel, a combined inductance of the plurality of coils can be changed, and it is possible to realize the load testing device capable of easily adjusting the power factor corresponding to various test target power sources.

Preferably, the reactor unit includes a first reactor side input terminal to be connected to the first test target power source and a second reactor side input terminal to be connected to the second test target power source.

When receiving power supply from the first test target power source, the power from the first test target power source is supplied to the first coil group through the first reactor side input terminal and a vacuum circuit breaker, and is supplied to the fine adjustment coil group through the first reactor side input terminal, the vacuum circuit breaker, and the bidirectional transformer.

When receiving power supply from the second test target power source, the power from the second test target power source is supplied to the first coil group through the second reactor side input terminal, a molded case circuit breaker, and the bidirectional transformer, and is supplied to the fine adjustment coil group though the second reactor side input terminal and the molded case circuit breaker.

It is easy to prevent damage or the like of members constituting the load testing device due to erroneous wiring.

Advantageous Effects of Invention

As described above, according to the present invention, it is possible to provide the load testing device capable of easily adjusting the power factor corresponding to the plurality of types of test target power sources.

DESCRIPTION OF EMBODIMENTS

Hereinafter, the present embodiment will be described with reference to the drawings.

Note that embodiments are not limited to the following embodiments. Further, contents described in one embodiment are similarly applied to other embodiments in principle. Furthermore, each embodiment and each modification can be appropriately combined.

In order to describe directions, the description will be made assuming that one of horizontal directions is an x direction (a left-right direction, a first direction), a horizontal direction perpendicular to the x direction is a y direction (a front-back direction, a second direction), and a vertical direction perpendicular to the x direction and the y direction is a z direction (an up-down direction, a third direction).

Figure 4:
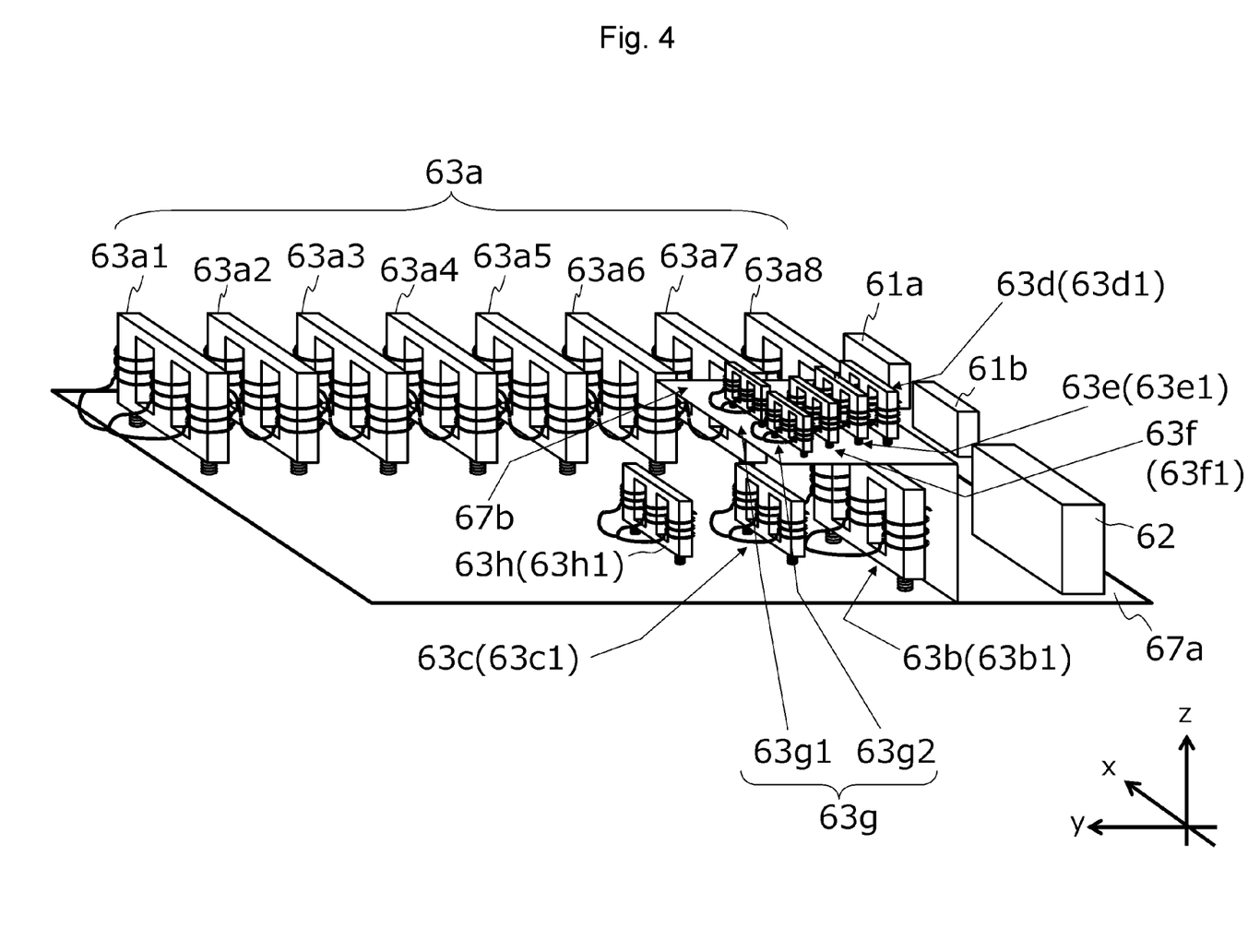
FIG. 4 is a perspective view illustrating the configuration of the reactor unit.
Figure 5:
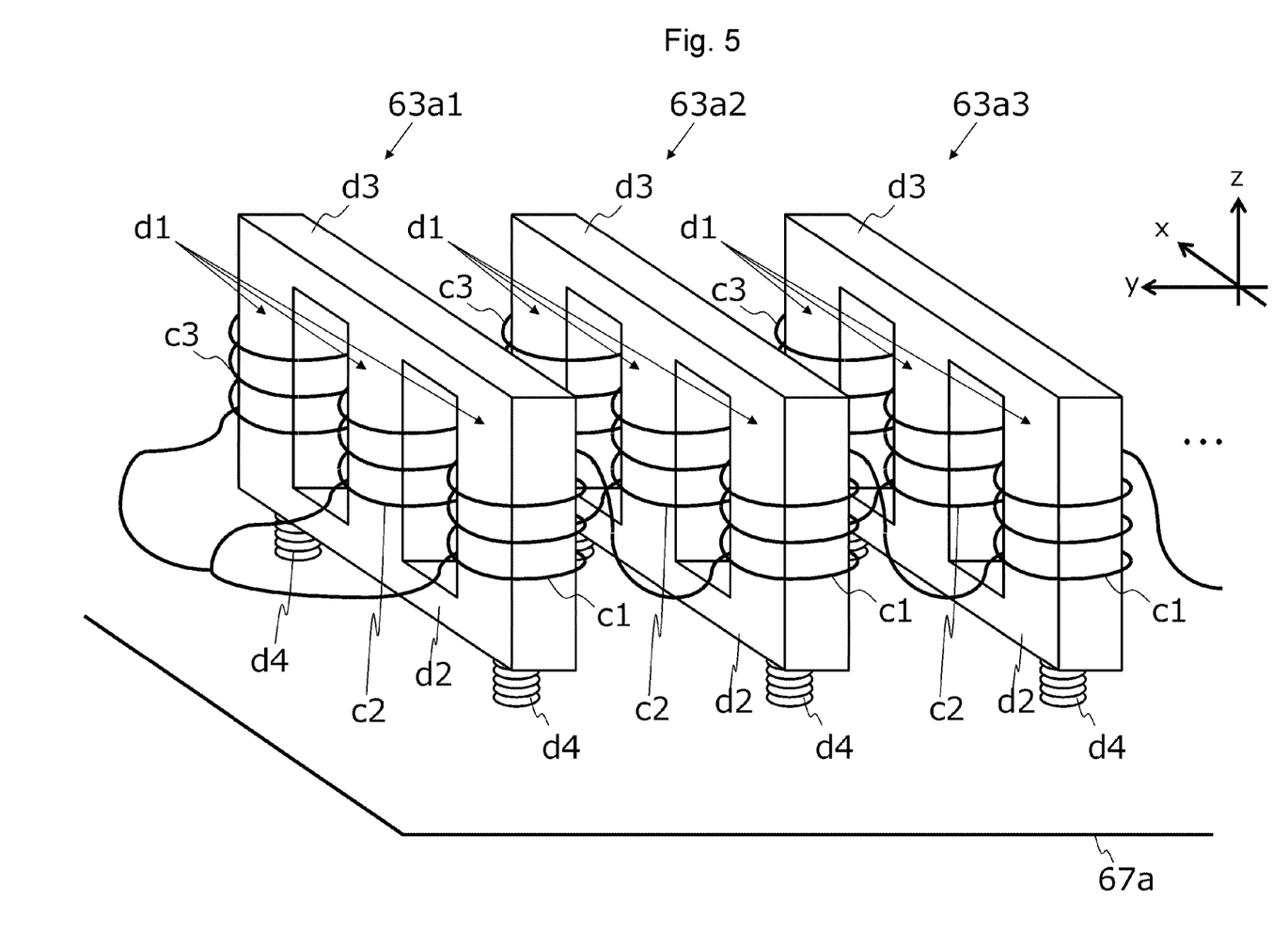
FIG. 5 is a perspective view of a 11th coil set to a 13th coil set.
Figure 6:
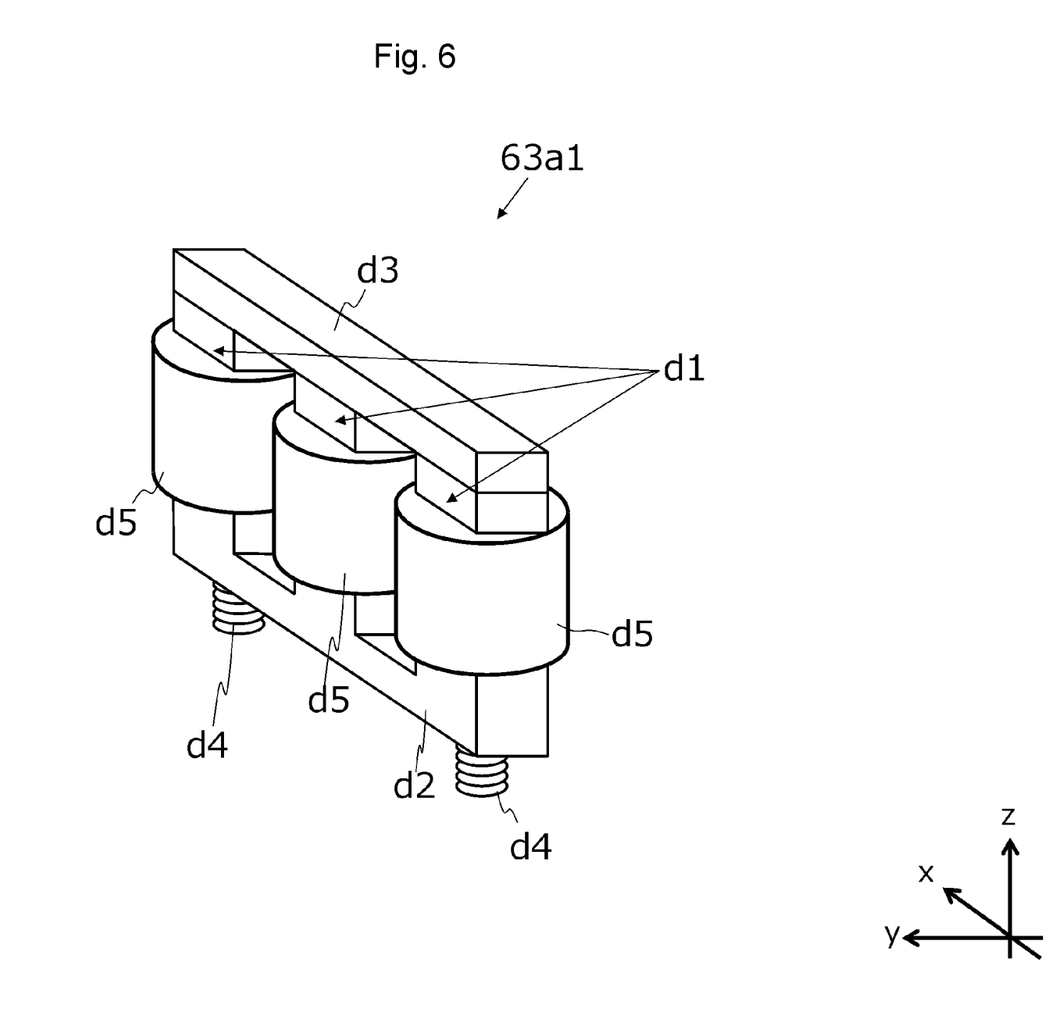
FIG. 6 is a perspective view of the 11th coil set provided with an insulating cover.

In FIGS. 4 to 6, directions indicated by arrows of xyz axes are respectively defined as a left direction, a front direction, and an upper direction.

Definition of Terms

In the present embodiment, one set of a U-phase coil, a V-phase coil, and a W-phase coil is defined as a coil set, and a group of one or more coil sets is defined as a coil group.
(Load Testing Device 1)

Figure 1:
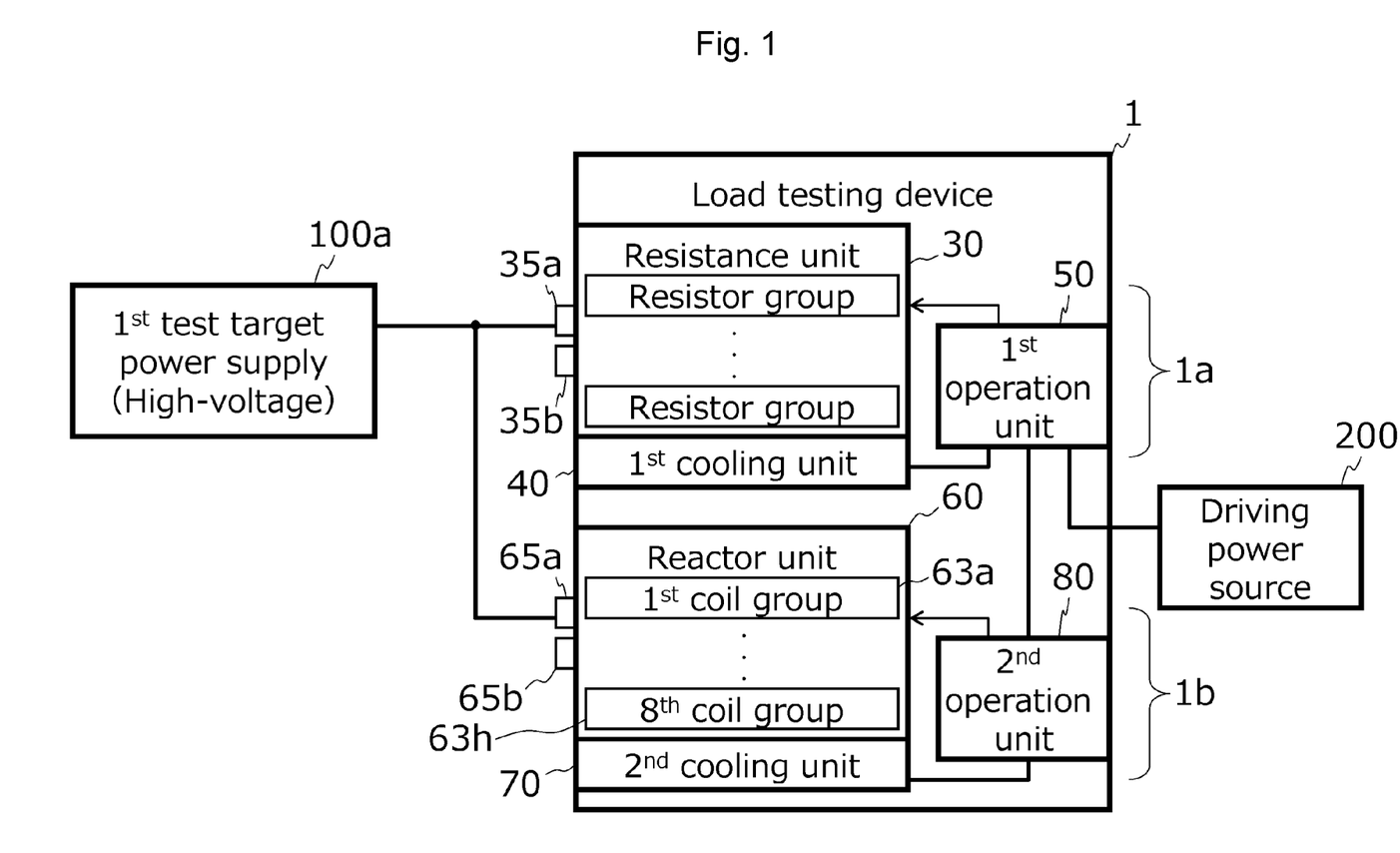
FIG. 1 is a schematic diagram illustrating a configuration of a load testing device, a first test target power source, and a driving power source according to the present embodiment.
Figure 2:
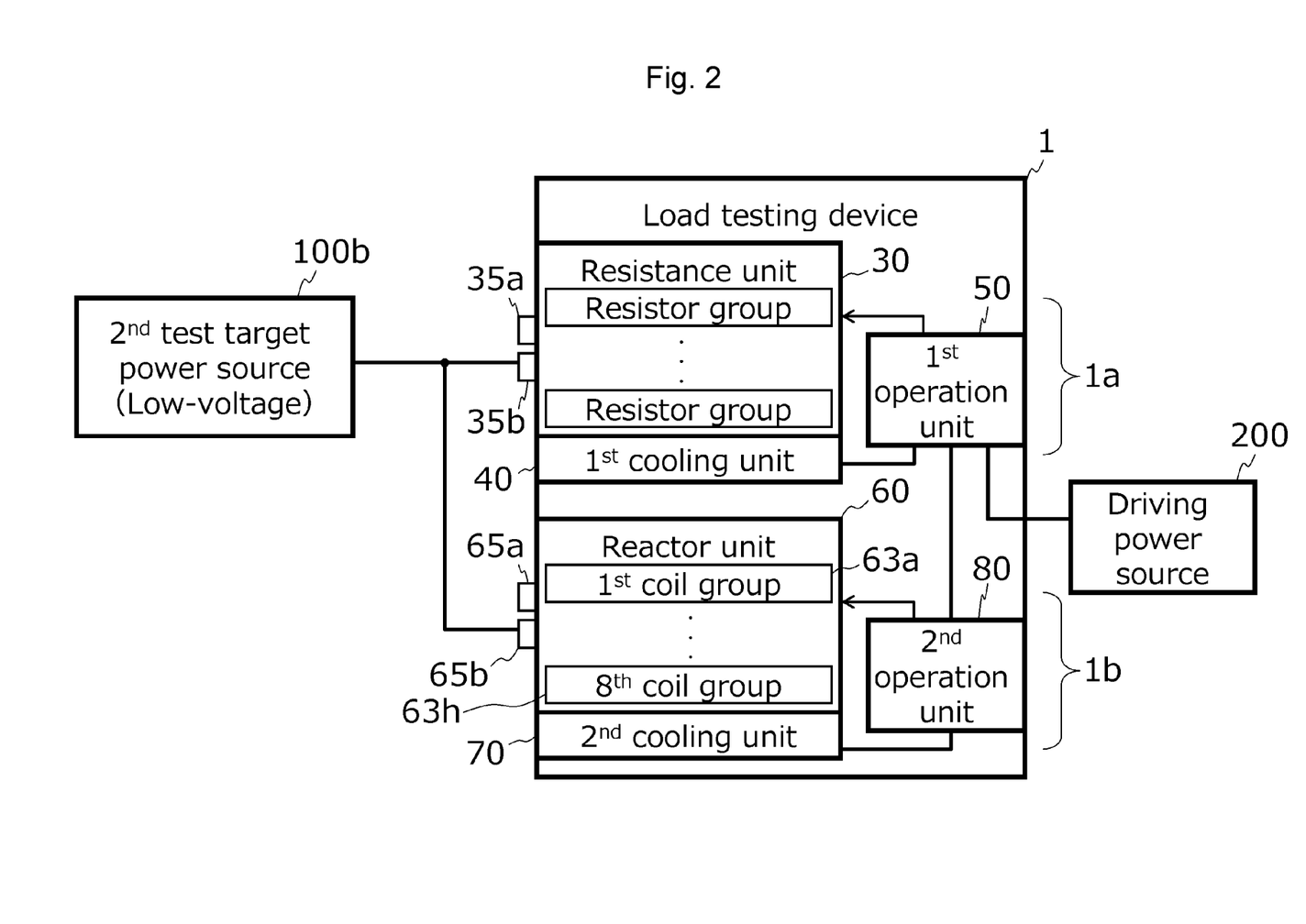
FIG. 2 is a schematic diagram illustrating a configuration of the load testing device, a second test target power source, and the driving power source according to the present embodiment.

A dry load testing device 1 according to the present embodiment includes a first load test region 1a and a second load test region 1b (see FIGS. 1 and 2).

The first load test region 1a includes a resistance unit 30, a first cooling unit 40, and a first operation unit 50.

The second load test region 1b includes a reactor unit 60, a second cooling unit 70, and a second operation unit 80.

The first load test region 1a and the second load test region 1b may be housed in one housing or may be housed in separate housings.
(Resistance Unit 30)

The resistance unit 30 includes a plurality of resistor groups, a first resistance unit side input terminal 35a, and a second resistance unit side input terminal 35b.

Each of the resistor groups includes one or more sets of a U-phase resistor, a V-phase resistor, and a W-phase resistor.

During a load test, power from a test target power source (a first test target power source 100a, a second test target power source 100b) is supplied to some or all of the plurality of resistor groups. A load amount is adjusted by selecting a resistor group that supplies the power from the test target power source among the plurality of resistor groups.
(First Resistance Unit Side Input Terminal 35a, Second Resistance Unit Side Input Terminal 35b)

The first resistance unit side input terminal 35a is used when a high-voltage load test is performed, and is connected to the first test target power source 100a (see FIG. 1).

The second resistance unit side input terminal 35b is used when a low-voltage load test is performed, and is connected to the second test target power source 100b (see FIG. 2).

When receiving power supply from the first test target power source 100a, power from the first test target power source 100a is supplied to the plurality of resistor groups through the first resistance unit side input terminal 35a.

When receiving power supply from the second test target power source 100b, power from the second test target power source 100b is supplied to the plurality of resistor groups through the second resistance unit side input terminal 35b.
(First Cooling Unit 40)

The first cooling unit 40 supplies cooling air to the plurality of resistor groups of the resistance unit 30.

In particular, the first cooling unit 40 supplies cooling air to a resistor group to which the power is supplied from the test target power source among the plurality of resistor groups.
(First Operation Unit 50)

The first operation unit 50 is used to adjust a use mode, a load amount, and a power factor of the load testing device 1.

The first operation unit 50 includes a mode switch, a fan switch, and an operation switch (not illustrated).

The mode switch is a rotary or slide type (or toggle type or push button type) operation switch.

The mode switch is used to select on/off of the load testing device 1, but may also be used to select (mode switch) the type (high voltage or low voltage) of the test target power source, a connection mode (series or parallel) of the resistor group, and the like.

Note that the mode switch may not be provided for selecting the connection mode of the resistor group, and the connection mode of the resistor group may be automatically determined by selecting the type of the test target power source.

When the load test is performed, the mode switch is set to an ON operation position. When the load testing device 1 is turned off, the mode switch is set to an OFF operation position.

The fan switch is a slide type (or toggle type or push button type) operation switch.

The fan switch is a switch for performing on/off control of the first cooling unit 40 and the second cooling unit 70 while the mode switch is in an on state. The fan switch may be omitted, and the first cooling unit 40 and the second cooling unit 70 may operate when the mode switch is set to the ON operation position. Further, in accordance with an on/off state of the operation switch, only a cooling device corresponding to the resistor group that has been turned on among cooling devices of the first cooling unit 40 and a cooling device corresponding to the coil group that has been turned on among cooling devices of the second cooling unit 70 may be turned on.

The operation switch is a slide type (or toggle type or push button type) operation switch.

The operation switch is a switch for adjusting the load amount, that is, for on/off control of switching devices corresponding to the plurality of resistor groups of the resistance unit 30, and for adjusting the power factor, that is, for on/off control of switching devices corresponding to a plurality of the coil groups of the reactor unit 60.

(Reactor Unit 60)

Figure 3:
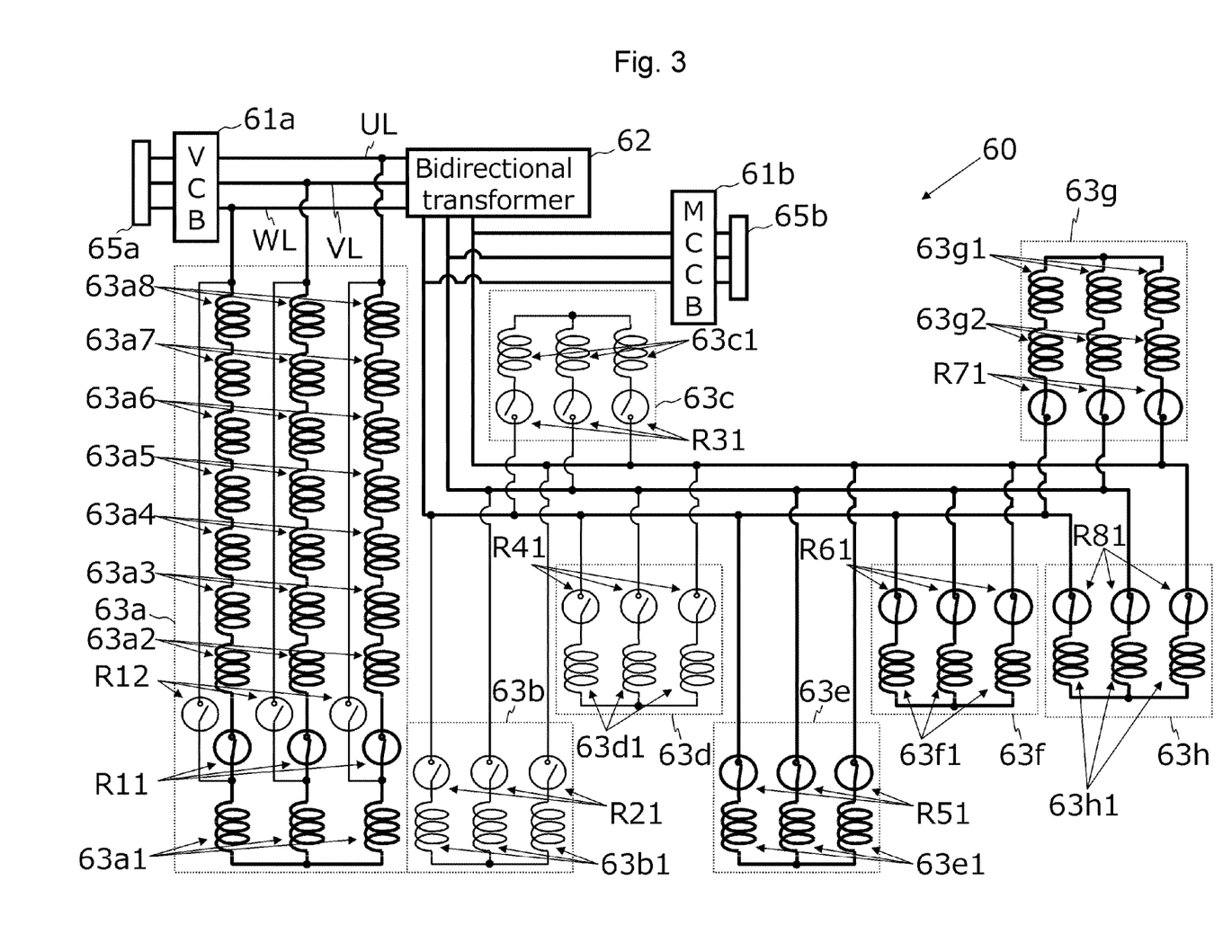
FIG. 3 is a schematic diagram illustrating a configuration of a reactor unit.

The reactor unit 60 includes a vacuum circuit breaker (VCB) 61*a*, a molded case circuit breaker (MCCB) 61*b*, a bidirectional transformer 62, a plurality of coil groups (a first coil group 63*a* to an eighth coil group 63*h*), a first reactor side input terminal 65*a*, and a second reactor side input terminal 65*b* (see FIG. 3).

(Vacuum Circuit Breaker 61*a*)

The vacuum circuit breaker 61*a* performs on/off control of power supply from the first test target power source 100*a* to the bidirectional transformer 62 and the first coil group 63*a* through the first reactor side input terminal 65*a*.

(Molded Case Circuit Breaker 61*b*)

The molded case circuit breaker 61*b* performs on/off control of power supply from the second test target power source 100*b* to the bidirectional transformer 62 and the second coil group 63*b* through the second reactor side input terminal 65*b*.

(Interlock Circuit)

An interlock circuit (not illustrated) may be provided between the vacuum circuit breaker 61*a* and the molded case circuit breaker 61*b*.

By the interlock circuit provided between the vacuum circuit breaker 61*a* and the molded case circuit breaker 61*b*, at least one of the vacuum circuit breaker 61*a* and the molded case circuit breaker 61*b* is turned off so that both are not simultaneously turned on.

(Bidirectional Transformer 62)

The bidirectional transformer 62 is a transformer capable of both boosting and stepping down.

The bidirectional transformer 62 steps down a voltage of power supplied from the first test target power source 100*a* through the first reactor side input terminal 65*a*.

The bidirectional transformer 62 boosts a voltage of power supplied from the second test target power source 100*b* through the second reactor side input terminal 65*b*.

(Plurality of Coil Groups)

During the load test involving power factor adjustment, the power from the test target power source (first test target power source 100*a*, second test target power source 100*b*) is supplied to some or all of the plurality of coil groups (the first coil group 63*a* to the eighth coil group 63*h*). The power factor is adjusted by selecting a coil group to which the power from the test target power source is supplied among the plurality of coil groups.

The first coil group 63*a* is used for main adjustment of the power factor, and the high voltage is applied thereto.

The second coil group 63*b* to the eighth coil group 63*h* are used for fine adjustment of the power factor, and the low voltage is applied thereto.

That is, when receiving power supply from the first test target power source 100*a* as the test target power source, the power from the first test target power source 100*a* is supplied to the first coil group 63*a* without passing through the bidirectional transformer 62, and is supplied to the fine adjustment coil group (the second coil group 63*b* to the eighth coil group 63*h*) in a stepped-down state through the bidirectional transformer 62.

When receiving power supply from the second test target power source 100*b* having a lower voltage than the first test target power source 100*a* as the test target power source, the power from the second test target power source 100*b* is supplied to the first coil group 63*a* in a boosted state through the bidirectional transformer 62, and is supplied to the fine adjustment coil group (the second coil group 63*b* to the eighth coil group 63*h*) without passing through the bidirectional transformer 62.

(First Coil Group 63*a*)

The first coil group 63*a* has eight coil sets (11th coil set 63*a*1 to 18th coil set 63*a*8) and two relay groups (11th relay group R11 and 12th relay group R12).

Each of the eight coil sets (the 11th coil set 63*a*1 to the 18th coil set 63*a*8) has a U-phase coil, a V-phase coil, and a W-phase coil.

Each of the two relay groups (the 11th relay group R11 and the 12th relay group R12) is a triple switch, and has a U-phase relay, a V-phase relay, and a W-phase relay.

The eight coil sets (The 11th coil set 63*a*1 to the 18th coil set 63*a*8) in the first coil group 63*a* are connected in a switchable state between a state where the coil sets are connected in series and a state where one of the plurality of coil sets is used alone by the two relay groups (the 11th relay group R11 and the 12th relay group R12).

The U-phase coils of the 11th coil set 63*a*1 to the 18th coil set 63*a*8 are connected in series.

The V-phase coils of the 11th coil set 63*a*1 to the 18th coil set 63*a*8 are connected in series.

The W-phase coils of the 11th coil set 63*a*1 to the 18th coil set 63*a*8 are connected in series.

One terminal of the U-phase coil of the 11th coil set 63*a*1, one terminal of the V-phase coil of the 11th coil set 63*a*1, and one terminal of the W-phase coil of the 11th coil set 63*a*1 are short-circuited.

The other terminal of the U-phase coil of the 11th coil set 63*a*1 is connected to one terminal of the U-phase coil of the 12th coil set 63*a*2 through the U-phase relay of the 11th relay group R11.

The other terminal of the U-phase coil of the 12th coil set 63*a*2 is connected to one terminal of the U-phase coil of the 13th coil set 63*a*3.

The other terminal of the U-phase coil of the 13th coil set 63*a*3 is connected to one terminal of the U-phase coil of the 14th coil set 63*a*4.

The other terminal of the U-phase coil of the 14th coil set 63*a*4 is connected to one terminal of the U-phase coil of the 15th coil set 63*a*5.

The other terminal of the U-phase coil of the 15th coil set 63a5 is connected to one terminal of the U-phase coil of the 16th coil set 63a6.

The other terminal of the U-phase coil of the 16th coil set 63a6 is connected to one terminal of the U-phase coil of the 17th coil set 63a7.

The other terminal of the U-phase coil of the 17th coil set 63a7 is connected to one terminal of the U-phase coil of the 18th coil set 63a8.

The other terminal of the U-phase coil of the 18th coil set 63a8 is connected to a U-phase line UL.

The U-phase line UL is an electric line extending from a U-phase terminal of the first reactor side input terminal 65a through the vacuum circuit breaker 61a and the bidirectional transformer 62.

The other terminal of the U-phase coil of the 11th coil set 63a1 is connected to the other terminal of the U-phase coil of the 18th coil set 63a8 through the U-phase relay of the 12th relay group R12.

The other terminal of the V-phase coil of the 11th coil set 63a1 is connected to one terminal of the V-phase coil of the 12th coil set 63a2 through the V-phase relay of the 11th relay group R11.

The other terminal of the V-phase coil of the 12th coil set 63a2 is connected to one terminal of the V-phase coil of the 13th coil set 63a3.

The other terminal of the V-phase coil of the 13th coil set 63a3 is connected to one terminal of the V-phase coil of the 14th coil set 63a4.

The other terminal of the V-phase coil of the 14th coil set 63a4 is connected to one terminal of the V-phase coil of the 15th coil set 63a5.

The other terminal of the V-phase coil of the 15th coil set 63a5 is connected to one terminal of the V-phase coil of the 16th coil set 63a6.

The other terminal of the V-phase coil of the 16th coil set 63a6 is connected to one terminal of the V-phase coil of the 17th coil set 63a7.

The other terminal of the V-phase coil of the 17th coil set 63a7 is connected to one terminal of the V-phase coil of the 18th coil set 63a8.

The other terminal of the V-phase coil of the 18th coil set 63a8 is connected to a V-phase line VL.

The V-phase line VL is an electric line extending from a V-phase terminal of the first reactor side input terminal 65a through the vacuum circuit breaker 61a and the bidirectional transformer 62.

The other terminal of the V-phase coil of the 11th coil set 63a1 is connected to the other terminal of the V-phase coil of the 18th coil set 63a8 through the V-phase relay of the 12th relay group R12.

The other terminal of the w-phase coil of the 11th coil set 63a1 is connected to one terminal of the W-phase coil of the 12th coil set 63a2 through the W-phase relay of the 11th relay group R11.

The other terminal of the W-phase coil of the 12th coil set 63a2 is connected to one terminal of the W-phase coil of the 13th coil set 63a3.

The other terminal of the W-phase coil of the 13th coil set 63a3 is connected to one terminal of the W-phase coil of the 14th coil set 63a4.

The other terminal of the W-phase coil of the 14th coil set 63a4 is connected to one terminal of the W-phase coil of the 15th coil set 63a5.

The other terminal of the W-phase coil of the 15th coil set 63a5 is connected to one terminal of the W-phase coil of the 16th coil set 63a6.

The other terminal of the W-phase coil of the 16th coil set 63a6 is connected to one terminal of the W-phase coil of the 17th coil set 63a7.

The other terminal of the W-phase coil of the 17th coil set 63a7 is connected to one terminal of the W-phase coil of the 18th coil set 63a8.

The other terminal of the W-phase coil of the 18th coil set 63a8 is connected to a W-phase line WL.

The W-phase line WL is an electric line extending from a W-phase terminal of the first reactor side input terminal 65a through the vacuum circuit breaker 61a and the bidirectional transformer 62.

The other terminal of the W-phase coil of the 11th coil set 63a1 is connected to the other terminal of the W-phase coil of the 18th coil set 63a8 through the W-phase relay of the 12th relay group R12.

The two relay groups (The 11th relay group R11 and the 12th relay group R12) are used to perform on/off control of power supply to the coil sets of the first coil group 63a.

In addition, the two relay groups (the 11th relay group R11 and the 12th relay group R12) are used to switch between an operation mode in which power is supplied to the eight coil sets (the 11th coil set 63a1 to the 18th coil set 63a8) and an operation mode in which the power is supplied to one coil set (the 11th coil set 63a1).

When the power is supplied to the coil sets of the first coil group 63a, one of the 11th relay group R11 and the 12th relay group R12 is turned on, and the other is turned off.

Specifically, when the power is supplied to the eight coil sets (the 11th coil set 63a1 to the 18th coil set 63a8), the 11th relay group R11 is turned on, and the 12th relay group R12 is turned off.

When the power is supplied to the one coil set (the 11th coil set 63a1), the 11th relay group R11 is turned off, and the 12th relay group R12 is turned on.

On/off control of the 11th relay group R11 and the 12th relay group R12 is performed based on an operation state of the operation switch of the first operation unit 50.

(Interlock Circuit of First Coil Group 63a)

An interlock circuit (not illustrated) may be provided between the 11th relay group R11 and the 12th relay group R12.

By the interlock circuit provided between the 11th relay group R11 and the 12th relay group R12, at least one of the 11th relay group R11 and the 12th relay group R12 is turned off so that both are not simultaneously turned on.

(Posture of Coil of Coil Set in First Coil Group 63a)

Each of the coils of the 11th coil set 63a1 to the 18th coil set 63a8 is disposed such that a central axis of the coil is parallel to the z direction.

The 11th coil set 63a1 to the 18th coil set 63a8 are arranged in the y direction (see FIG. 4).

Each of the 11th coil set 63a1 to the 18th coil set 63a8 is held by a coil holding member, and said holding members are attached to a first holding surface 67a.

A configuration of the coil holding member will be described later.

(Second Coil Group 63b)

The second coil group 63b has one coil set (21st coil set 63b1) and one relay group (21st relay group R21).

The one coil set (21st coil set 63b1) has a U-phase coil, a V-phase coil, and a W-phase coil.

The one relay group (21st relay group R21) is a triple switch, and has a U-phase relay, a V-phase relay, and a W-phase relay.

One terminal of the U-phase coil of the 21st coil set 63*b*1, one terminal of the V-phase coil of the 21st coil set 63*b*1, and one terminal of the W-phase coil of the 21st coil set 63*b*1 are short-circuited.

The other terminal of the U-phase coil of the 21st coil set 63*b*1 is connected to the U-phase line UL through the U-phase relay of the 21st relay group R21.

The other terminal of the V-phase coil of the 21st coil set 63*b*1 is connected to the V-phase line VL through the V-phase relay of the 21st relay group R21.

The other terminal of the W-phase coil of the 21st coil set 63*b*1 is connected to the W-phase line WL through the W-phase relay of the 21st relay group R21.

The one relay group (21st relay group R21) is used to perform on/off control of power supply to the coil sets of the second coil group 63*b*.

When the power is supplied to the coil sets of the second coil group 63*b*, the 21st relay group R21 is turned on.

The on/off control of the 21st relay group R21 is performed based on the operation state of the operation switch of the first operation unit 50.

Each of the coils of the 21st coil set 63*b*1 is disposed such that the central axis is parallel to the z direction.

The 21st coil set 63*b*1 is held by a coil holding member, and said holding member is attached to the first holding surface 67*a*.

A configuration of the coil holding member will be described later.

(Third Coil Group 63*c*)

The third coil group 63*c* has one coil set (31st coil set 63*c*1) and one relay group (31st relay group R31).

The one coil set (31st coil set 63*c*1) has a U-phase coil, a V-phase coil, and a W-phase coil.

The one relay group (31st relay group R31) is a triple switch, and has a U-phase relay, a V-phase relay, and a W-phase relay.

One terminal of the U-phase coil of the 31st coil set 63*c*1, one terminal of the V-phase coil of the 31st coil set 63*c*1, and one terminal of the W-phase coil of the 31st coil set 63*c*1 are short-circuited.

The other terminal of the U-phase coil of the 31st coil set 63*c*1 is connected to the U-phase line UL through the U-phase relay of the 31st relay group R31.

The other terminal of the V-phase coil of the 31st coil set 63*c*1 is connected to the V-phase line VL through the V-phase relay of the 31st relay group R31.

The other terminal of the W-phase coil of the 31st coil set 63*c*1 is connected to the W-phase line WL through the W-phase relay of the 31st relay group R31.

The one relay group (31st relay group R31) is used to perform on/off control of power supply to the coil sets of the third coil group 63*c*.

When the power is supplied to the coil sets of the third coil group 63*c*, the 31st relay group R31 is turned on.

The on/off control of the 31st relay group R31 is performed based on the operation state of the operation switch of the first operation unit 50.

Each of the coils of the 31st coil set 63*c*1 is disposed such that the central axis is parallel to the z direction.

The 31st coil set 63*c*1 is held by a coil holding member, and said holding member is attached to the first holding surface 67*a*.

A configuration of the coil holding member will be described later.

(Fourth Coil Group 63*d*)

The fourth coil group 63*d* has one coil set (41st coil set 63*d*1) and one relay group (41st relay group R41). The one coil set (41st coil set 63*d*1) has a U-phase coil, a V-phase coil, and a W-phase coil.

The one relay group (41st relay group R41) is a triple switch, and has a U-phase relay, a V-phase relay, and a W-phase relay.

One terminal of the U-phase coil of the 41st coil set 63*d*1, one terminal of the V-phase coil of the 41st coil set 63*d*1, and one terminal of the W-phase coil of the 41st coil set 63*d*1 are short-circuited.

The other terminal of the U-phase coil of the 41st coil set 63*d*1 is connected to the U-phase line UL through the U-phase relay of the 41st relay group R41.

The other terminal of the V-phase coil of the 41st coil set 63*d*1 is connected to the V-phase line VL through the V-phase relay of the 41st relay group R41.

The other terminal of the W-phase coil of the 41st coil set 63*d*1 is connected to the W-phase line WL through the W-phase relay of the 41st relay group R41.

The one relay group (41st relay group R41) is used to perform on/off control of power supply to the coil sets of the fourth coil group 63*d*.

When the power is supplied to the coil sets of the fourth coil group 63*d*, the 41st relay group R41 is turned on.

The on/off control of the 41st relay group R41 is performed based on the operation state of the operation switch of the first operation unit 50.

Each of the coils of the 41st coil set 63*d*1 is disposed such that the central axis is parallel to the z direction.

The 41st coil set 63*d*1 is held by a coil holding member, and said holding member is attached to a second holding surface 67*b*.

A configuration of the coil holding member will be described later.

(Fifth Coil Group 63*e*)

The fifth coil group 63*e* has one coil set (51st coil set 63*e*1) and one relay group (51st relay group R51).

The one coil set (51st coil set 63*e*1) has a U-phase coil, a V-phase coil, and a W-phase coil.

The one relay group (51st relay group R51) is a triple switch, and has a U-phase relay, a V-phase relay, and a W-phase relay.

One terminal of the U-phase coil of the 51st coil set 63*e*1, one terminal of the V-phase coil of the 51st coil set 63*e*1, and one terminal of the W-phase coil of the 51st coil set 63*e*1 are short-circuited.

The other terminal of the U-phase coil of the 51st coil set 63*e*1 is connected to the U-phase line UL through the U-phase relay of the 51st relay group R51.

The other terminal of the V-phase coil of the 51st coil set 63*e*1 is connected to the V-phase line VL through the V-phase relay of the 51st relay group R51.

The other terminal of the W-phase coil of the 51st coil set 63*e*1 is connected to the W-phase line WL through the W-phase relay of the 51st relay group R51.

The one relay group (51st relay group R51) is used to perform on/off control of power supply to the coil sets of the fifth coil group 63*e*.

When the power is supplied to the coil sets of the fifth coil group 63*e*, the 51st relay group R51 is turned on.

The on/off control of the 51st relay group R51 is performed based on the operation state of the operation switch of the first operation unit 50.

Each of the coils of the 51st coil set 63*e*1 is disposed such that the central axis is parallel to the z direction.

The 51st coil set 63*e*1 is held by a coil holding member, and said holding member is attached to the second holding surface 67*b*.

A configuration of the coil holding member will be described later.

(Sixth Coil Group 63*f*)

The sixth coil group 63*f* has one coil set (61st coil set 63*f*1) and one relay group (61st relay group R61).

The one coil set (61st coil set 63*f*1) has a U-phase coil, a V-phase coil, and a W-phase coil.

The one relay group (61st relay group R61) is a triple switch, and has a U-phase relay, a V-phase relay, and a W-phase relay.

One terminal of the U-phase coil of the 61st coil set 63*f*1, one terminal of the V-phase coil of the 61st coil set 63*f*1, and one terminal of the W-phase coil of the 61st coil set 63*f*1 are short-circuited.

The other terminal of the U-phase coil of the 61st coil set 63*f*1 is connected to the U-phase line UL through the U-phase relay of the 61st relay group R61.

The other terminal of the V-phase coil of the 61st coil set 63*f*1 is connected to the V-phase line VL through the V-phase relay of the 61st relay group R61.

The other terminal of the W-phase coil of the 61st coil set 63*f*1 is connected to the W-phase line WL through the W-phase relay of the 61st relay group R61.

The one relay group (61st relay group R61) is used to perform on/off control of power supply to the coil sets of the sixth coil group 63*f*.

When the power is supplied to the coil sets of the sixth coil group 63*f*, the 61st relay group R61 is turned on.

The on/off control of the 61st relay group R61 is performed based on the operation state of the operation switch of the first operation unit 50.

Each of the coils of the 61st coil set 63*f*1 is disposed such that the central axis is parallel to the z direction.

The 61st coil set 63*f*1 is held by a coil holding member, and said holding member is attached to the second holding surface 67*b*.

A configuration of the coil holding member will be described later.

(Seventh Coil Group 63*g*)

The seventh coil group 63*g* has two coil sets (71st coil set 63*g*1 and 72nd coil set 63*g*2) and one relay groups (71st relay group R71).

Each of the two coil sets (71st coil set 63*g*1 and 72nd coil set 63*g*2) has a U-phase coil, a V-phase coil, and a W-phase coil.

The U-phase coils of the 71st coil set 63*g*1 and 72nd coil set 63*g*2 are connected in series.

The V-phase coils of the 71st coil set 63*g*1 and 72nd coil set 63*g*2 are connected in series.

The W-phase coils of the 71st coil set 63*g*1 and 72nd coil set 63*g*2 are connected in series.

The one relay group (71st relay group R71) is a triple switch, and has a U-phase relay, a V-phase relay, and a W-phase relay.

One terminal of the U-phase coil of the 71st coil set 63*g*1, one terminal of the V-phase coil of the 71st coil set 63*g*1, and one terminal of the W-phase coil of the 71st coil set 63*g*1 are short-circuited.

The other terminal of the U-phase coil of the 71st coil set 63*g*1 is connected to one terminal of the U-phase coil of the 72nd coil set 63*g*2.

The other terminal of the U-phase coil of the 72nd coil set 63*g*2 is connected to the U-phase line UL through the U-phase relay of the 71st relay group R71.

The other terminal of the V-phase coil of the 71st coil set 63*g*1 is connected to one terminal of the V-phase coil of the 72nd coil set 63*g*2.

The other terminal of the V-phase coil of the 72nd coil set 63*g*2 is connected to the V-phase line VL through the V-phase relay of the 71st relay group R71.

The other terminal of the W-phase coil of the 71st coil set 63*g*1 is connected to one terminal of the W-phase coil of the 72nd coil set 63*g*2.

The other terminal of the w-phase coil of the 72nd coil set 63*g*2 is connected to the W-phase line WL through the W-phase relay of the 71st relay group R71.

The one relay group (71st relay group R71) is used to perform on/off control of power supply to the coil sets of the seventh coil group 63*g*.

When the power is supplied to the coil sets of the seventh coil group 63*g*, the 71st relay group R71 is turned on.

The on/off control of the 71st relay group R71 is performed based on the operation state of the operation switch of the first operation unit 50.

Each of the coils of the 71st coil set 63*g*1 and the 72nd coil set 63*g*2 is disposed such that the central axis is parallel to the z direction.

The 71st coil set 63*g*1 and the 72nd coil set 63*g*2 are arranged in the x direction.

Each of the 71st coil set 63*g*1 and the 72nd coil set 63*g*2 is held by a coil holding member, and said holding members are attached to the second holding surface 67*b*.

A configuration of the coil holding member will be described later.

(Eighth Coil Group 63*h*)

The eighth coil group 63*h* has one coil set (81st coil set 63*h*1) and one relay group (81st relay group R81).

The one coil set (81st coil set 63*h*1) has a U-phase coil, a V-phase coil, and a W-phase coil.

The one relay group (81st relay group R81) is a triple switch, and has a U-phase relay, a V-phase relay, and a W-phase relay.

One terminal of the U-phase coil of the 81st coil set 63*h*1, one terminal of the V-phase coil of the 81st coil set 63*h*1, and one terminal of the W-phase coil of the 81st coil set 63*h*1 are short-circuited.

The other terminal of the U-phase coil of the 81st coil set 63*h*1 is connected to the U-phase line UL through the U-phase relay of the 81st relay group R81.

The other terminal of the V-phase coil of the 81st coil set 63*h*1 is connected to the V-phase line VL through the V-phase relay of the 81st relay group R81.

The other terminal of the W-phase coil of the 81st coil set 63*h*1 is connected to the W-phase line WL through the W-phase relay of the 81st relay group R81.

The one relay group (81st relay group R81) is used to perform on/off control of power supply to the coil sets of the eighth coil group 63*h*.

When the power is supplied to the coil sets of the eighth coil group 63*h*, the 81st relay group R81 is turned on.

The on/off control of the 81st relay group R81 is performed based on the operation state of the operation switch of the first operation unit 50.

Each of the coils of the 81st coil set 63*h*1 is disposed such that the central axis is parallel to the z direction.

The 81st coil set 63*h*1 is held by a coil holding member, and said holding member is attached to the first holding surface 67*a*.

A configuration of the coil holding member will be described later.

(Coil Holding Member of Each Coil Set)

Next, the configuration of the coil holding member that holds the coil of each coil set will be described.

A size of the coil holding member is determined by a size of the coil to be held.

The coil holding member includes an iron core d1, a lower coupling portion d2, an upper coupling portion d3, and an insulator d4 (see FIG. 5).

FIG. 5 illustrates the 11th coil set 63a1, the 12th coil set 63a2, and the 13th coil set 63a3 of the first coil group 63a, and three coil holding members that hold the coils of these coil sets.

Three iron cores d1 extend in the z direction and pass inside the coils constituting the coil set.

Among the three iron cores d1, a first iron core passes inside a first coil c1.

The first coil c1 corresponds to, for example, the U-phase coil.

Among the three iron cores d1, a second iron core passes inside a second coil c2.

The second coil c2 corresponds to, for example, the V-phase coil.

Among the three iron cores d1, a third iron core passes inside a third coil c3.

The third coil c3 corresponds to, for example, the W-phase coil.

Lower portions of the three iron cores d1 are coupled via the lower coupling portion d2 extending in the x direction.

Therefore, the first coil c1, the second coil c2, and the third coil c3 are held by the three iron cores d1 and the lower coupling portion d2.

Upper portions of the three iron cores d1 are coupled via the upper coupling portion d3 extending in the x direction.

The three iron cores d1 and one of the lower coupling portion d2 and the upper coupling portion d3 are integrally configured.

The other of the lower coupling portion d2 and the upper coupling portion d3 is configured separately from one in which the three iron cores d1 and one of the lower coupling portion d2 and the upper coupling portion d3 are integrally configured.

After the first coil c1, the second coil c2, and the third coil c3 are attached to the iron cores d1, the other of the lower coupling portion d2 and the upper coupling portion d3 is attached to the three iron cores d1.

In the present embodiment, an example is described in which the lower coupling portion d2 is configured integrally with the three iron cores d1, and the upper coupling portion d3 is configured separately from one in which the lower coupling portion d2 and the three iron cores d1 are integrally configured.

FIG. 6 illustrates a boundary between the upper coupling portion d3 and the three iron cores d1, but said boundary is omitted in FIGS. 4 and 5.

Note that the three iron cores d1, the lower coupling portion d2, and the upper coupling portion d3 may be integrally configured. In this case, the first coil c1, the second coil c2, and the third coil c3 are attached to the iron cores d1 by winding.

The lower coupling portion d2 is attached to the holding surface (the first holding surface 67a or the second holding surface 67b) via the insulator d4.

Note that in the present embodiment, an example is described in which each of the coil sets of the first coil group 63a, the second coil group 63b, the third coil group 63c, and the eighth coil group 63h is attached to the first holding surface 67a, and each of the coil sets of the fourth coil group 63d, the fifth coil group 63e, the sixth coil group 63f, and the seventh coil group 63g is attached to the second holding surface 67b.

(Insulating Cover d5)

In order to improve insulation, it is desirable that a coil and a short-circuit point are covered with an insulating cover d5 (see FIG. 6).

(First Reactor Side Input Terminal 65a and Second Reactor Side Input Terminal 65b)

The first reactor side input terminal 65a is used when the high-voltage load test involving power factor adjustment is performed, and is connected to the first test target power source 100a (see FIG. 1).

The second reactor side input terminal 65b is used when the low-voltage load test involving power factor adjustment is performed, and is connected to the second test target power source 100b (see FIG. 2).

When receiving power supply from the first test target power source 100a, the power from the first test target power source 100a is supplied to the first coil group 63a through the first reactor side input terminal 65a and the vacuum circuit breaker 61a, and is supplied to the fine adjustment coil group (the second coil group 63b to the eighth coil group 63h) through the first reactor side input terminal 65a, the vacuum circuit breaker 61a, and the bidirectional transformer 62.

When receiving power supply from the second test target power source 100b, the power from the second test target power source 100b is supplied to the first coil group 63a through the second reactor side input terminal 65b, the molded case circuit breaker 61b, and the bidirectional transformer 62, and is supplied to the fine adjustment coil group (the second coil group 63b to the eighth coil group 63h) through the second reactor side input terminal 65b and the molded case circuit breaker 61b.

(First Holding Surface 67a and Second Holding Surface 67b)

The first holding surface 67a holds the vacuum circuit breaker 61a, the molded case circuit breaker 61b, the bidirectional transformer 62, the first coil group 63a, the second coil group 63b, the third coil group 63c, and the eighth coil group 63h.

The second holding surface 67b is provided above a region where the second coil group 63b and the third coil group 63c are present in the first holding surface 67a.

The second holding surface 67b holds the fourth coil group 63d, the fifth coil group 63e, the sixth coil group 63f, and the seventh coil group 63g.

(Second Cooling Unit 70)

The second cooling unit 70 supplies cooling air to the first coil group 63a to the eighth coil group 63h of the reactor unit 60.

In particular, the second cooling unit 70 supplies cooling air to a coil set to which the power is supplied from the test object power source among the plurality of coil sets.

The second cooling unit 70 may be omitted.

(Second Operation Unit 80)

The second operation unit 80 has an on/off switch of the second load test region 1b (not illustrated).

The on/off switch of the second load test region 1b is a slide type (or toggle type or push button type) operation switch.

The on/off switch of the second load test region 1b is a switch for performing on/off control of supply of power, that has been sent from the test target power source (the first test target power source 100a or the second test target power source 100b), to the reactor unit 60 of the second load test region 1b.

When the on/off switch of the second load test region 1b in the second operation unit 80 is turned on in a state where the mode switch of the first operation unit 50 sets the type of the test target power source to a high-voltage test target power source, the vacuum circuit breaker 61a is turned on, and the molded case circuit breaker 61b is turned off.

In this case, power supply to the reactor unit 60 is enabled via the vacuum circuit breaker 61a, and on/off control of the relay (such as the 11th relay group R11) of the reactor unit 60 is performed on the basis of information on the operation state of the operation switch transmitted from the first operation unit 50 to the second operation unit 80.

When the on/off switch of the second load test region 1b in the second operation unit 80 is turned on in a state where the mode switch of the first operation unit 50 sets the type of the test target power source to a low-voltage test target power source, the vacuum circuit breaker 61a is turned off, and the molded case circuit breaker 61b is turned on.

In this case, power supply to the reactor unit 60 is enabled via the molded case circuit breaker 61b, and the on/off control of the relay (such as the 11th relay group R11) of the reactor unit 60 is performed on the basis of information on the operation state of the operation switch transmitted from the first operation unit 50 to the second operation unit 80.

When the on/off switch of the second load test region 1b in the second operation unit 80 is turned off, the vacuum circuit breaker 61a and the molded case circuit breaker 61b are turned off.

(Power Supply Source of Each Unit)

The first cooling unit 40, the second cooling unit 70, the relay that performs on/off control of power supply to the resistor group of the resistance unit 30, and the relay (such as the 11th relay group R11) that performs on/off control of power supply to the coil set of the reactor unit 60 operate on the basis of power supplied from a driving power source 200 different from the test target power source (the first test target power source 100a or the second test target power source 100b).

However, the first cooling unit 40, the second cooling unit 70, the relay that performs on/off control of power supply to the resistor group of the resistance unit 30, and the relay (such as the 11th relay group R11) that performs on/off control of power supply to the coil set of the reactor unit 60 may operate on the basis of power supplied from the test target power source (the first test target power source 100a or the second test target power source 100b).

(Effect of Providing Plurality of Types of Coil Groups and Bidirectional Transformer)

A main adjustment coil group (The first coil group 63a), the fine adjustment coil group (the second coil group 63b to the eighth coil group 63h), and the bidirectional transformer 62 are provided, and the power is supplied to said coil group in a state where a part of the power from the test target power source is boosted or stepped down.

Thus, it is possible to realize a load testing device 1 capable of easily adjusting the power factor corresponding to both the high-voltage test target power source (first test target power source 100a) and the low-voltage test target power source (second test target power source 100b).

(Effect of Providing Plurality of Coil Holding Members Respectively Corresponding to Plurality of Coil Sets)

Each of the plurality of coil holding members holds the coil set.

The iron core d1 holds the coil (such as the coil of the 11th coil set 63a1), and the holding surface (such as the first holding surface 67a) of the housing of the second load test region 1b holds the lower coupling portion d2 via the insulator d4. This makes it possible to stably hold the coil while maintaining electrical insulation.

In addition, as compared with a form in which one coil holding member holds the plurality of coil sets, it is less susceptible to electromagnetic influence from other coils.

(Effect of Configuring Part of Coupling Portion Separately)

After the iron core is passed inside the coil, a part of the coupling portion (for example, the upper coupling portion d3) can be attached to the iron core to form the coil holding member.

(Effect of Arranging Coil Groups One Above the Other)

By providing a plurality of surfaces (holding surfaces) for holding the coil groups on the upper and lower sides, it is possible to accommodate a large number of coil groups by effectively utilizing a region above a region where small coil groups are provided.

(Effect of Providing Insulating Cover d5)

As compared with a form in which the insulating cover d5 is not provided, it is possible to prevent adhesion of dust or the like to the coil and to be less susceptible to the electromagnetic influence from other coils.

(Effect of Coil Set (11th Coil Set 63a1 or the Like) being Connected with Connection Mode Switchable)

By switching the connection mode between series and parallel, a combined inductance of the plurality of coils (the U-phase coil of the 11th coil set 63a1 and the like) can be changed, and it is possible to realize the load testing device 1 capable of easily adjusting the power factor corresponding to various test target power sources.

(Effects of Having Separate Input Terminals for High Voltage and Low Voltage)

It is easy to prevent damage or the like of members constituting the load testing device 1 due to erroneous wiring.

(Application Example of on/Off Control of Relay of Reactor Unit 60)

Note that in the present embodiment, an example has been described in which the on/off control of the relay (such as the 11th relay group R11) of the reactor unit 60 is performed in conjunction with the operation state of the first operation unit 50.

However, a switch for performing on/off control of the relay (such as the 11th relay group R11) of the reactor unit 60 may be provided in the second operation unit 80, and the on/off control of the relay (such as the 11th relay group R11) of the reactor unit 60 may be performed independently without interlocking with the operation state of the first operation unit 50.

(Application Examples of the Number of Coil Groups and the Number of Coil Sets)

In the present embodiment, an example in which 1 to 8 coil sets are provided in each of the 8 coil groups has been described. However, the number of coil groups is not limited to 8, and the number of coil sets included in one coil group is not limited to 1 to 8.

In the present embodiment, an example has been described in which the connection mode of the coil set and a power supply target are switched using the two relay groups (the 11th relay group R11 and the 12th relay group R12). However, the number of relay groups and a connection method for switching the connection mode and the like are not limited thereto.

Although some embodiments of the present invention have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

REFERENCE SIGNS LIST 1 load testing device
1a first load test region
1b second load test region
30 resistance unit
35a first resistance unit side input terminal
35b second resistance unit side input terminal
40 first cooling unit
50 first operation unit
60 reactor unit
61a vacuum circuit breaker
61b molded case circuit breaker
62 bidirectional transformer
63a first coil group
63a1 to 63a8 11th coil set to 18th coil set
63b second coil group
63b1 21st coil set
63c third coil group
63c1 31st coil set
63d fourth coil group
63d1 41st coil set
63e fifth coil group
63e1 51st coil set
63f sixth coil group
63f1 61st coil set
63g seventh coil group
63g1 71st coil set
63g2 72nd coil set
63h eighth coil group
63h1 81st coil set
65a first reactor side input terminal
65b second reactor side input terminal
67a first holding surface
67b second holding surface
70 second cooling unit
80 second operation unit
100a first test target power source
100b second test target power source
200 driving power source
c1 first coil (U-phase coil)
c2 second coil (V-phase coil)
c3 third coil (W-phase coil)
d1 iron core
d2 lower coupling portion
d3 upper coupling portion
d4 insulator
d5 Insulating cover
R11 11th relay group
R12 12th relay group
R21 21st relay group
R31 31st relay group
R41 41st relay group
R51 51st relay group
R61 61st relay group
R71 71st relay group
R81 81st relay group
UL U-phase line
VL V-phase line
WL W-phase line.

The invention claimed is:

1. A load testing device comprising:
a resistance unit provided with a plurality of resistor groups and receiving power supply from a test target power source; and
a reactor unit having a bidirectional transformer and at least a first coil group and a fine adjustment coil group, and receiving power supply from the test target power source, wherein
each of the first coil group and the fine adjustment coil group includes one or more coil sets including a U-phase coil, a V-phase coil, and a W-phase coil,
when receiving power supply from a first test target power source as the test target power source, power from the first test target power source is supplied to the first coil group without passing through the bidirectional transformer, and is supplied to the fine adjustment coil group in a stepped-down state through the bidirectional transformer, and
when receiving power supply from a second test target power source having a lower voltage than the first test target power source as the test target power source, power from the second test target power source is supplied to the first coil group in a boosted state through the bidirectional transformer, and is supplied to the fine adjustment coil group without passing through the bidirectional transformer.

2. The load testing device according to claim 1, wherein the first coil group includes a plurality of the coil sets, the fine adjustment coil group includes a plurality of coil, each of the plurality of coil groups of the fine adjustment coil group includes one or more of the coil sets, each of the coil sets of the first coil group and the coil sets of the plurality of coil groups of the fine adjustment coil group is held by a coil holding member, and the coil holding member includes: an iron core passing inside the U-phase coil; an iron core passing inside the V-phase coil; an iron core passing inside the W-phase coil; and a coupling portion for coupling the three iron cores.

3. The load testing device according to claim 2, wherein the three iron cores extend in an up-down direction, the coupling portion includes a lower coupling portion for coupling lower portions of the three iron cores and an upper coupling portion for coupling upper portions of the three iron cores, the three iron cores and one of the lower coupling portion and the upper coupling portion are integrally configured, and the other of the lower coupling portion and the upper coupling portion is configured separately from the three iron cores.

4. The load testing device according to claim 2, wherein some of the plurality of coil groups of the fine adjustment coil group are attached to a first holding surface, and the others are attached to a second holding surface provided above the first holding surface.

5. The load testing device according to claim 2, wherein the coil holding member includes an insulating cover that covers the U-phase coil, the V-phase coil, and the W-phase coil.

6. The load testing device according to claim 1, wherein the first coil group includes a plurality of the coil sets, and the plurality of coil sets in the first coil group are connected in a switchable state between a state where the plurality of coil sets are connected in series and a state where one of the plurality of coil sets is used alone.

7. The load testing device according to claim 1, wherein the reactor unit includes a first reactor side input terminal to be connected to the first test target power source and a second reactor side input terminal to be connected to the second test target power source, when receiving power supply from the first test target power source, the power from the first test target power source is supplied to the first coil group through the first reactor side input terminal and a vacuum circuit breaker, and is supplied to the fine adjustment coil group through the first reactor side input terminal, the vacuum circuit breaker, and the bidirectional transformer, and when receiving power supply from the second test target power source, the power from the second test target power source is supplied to the first coil group through the second reactor side input terminal, a molded case circuit breaker, and the bidirectional transformer, and is supplied to the fine adjustment coil group though the second reactor side input terminal and the molded case circuit breaker.

* * * * *